Fig. 3

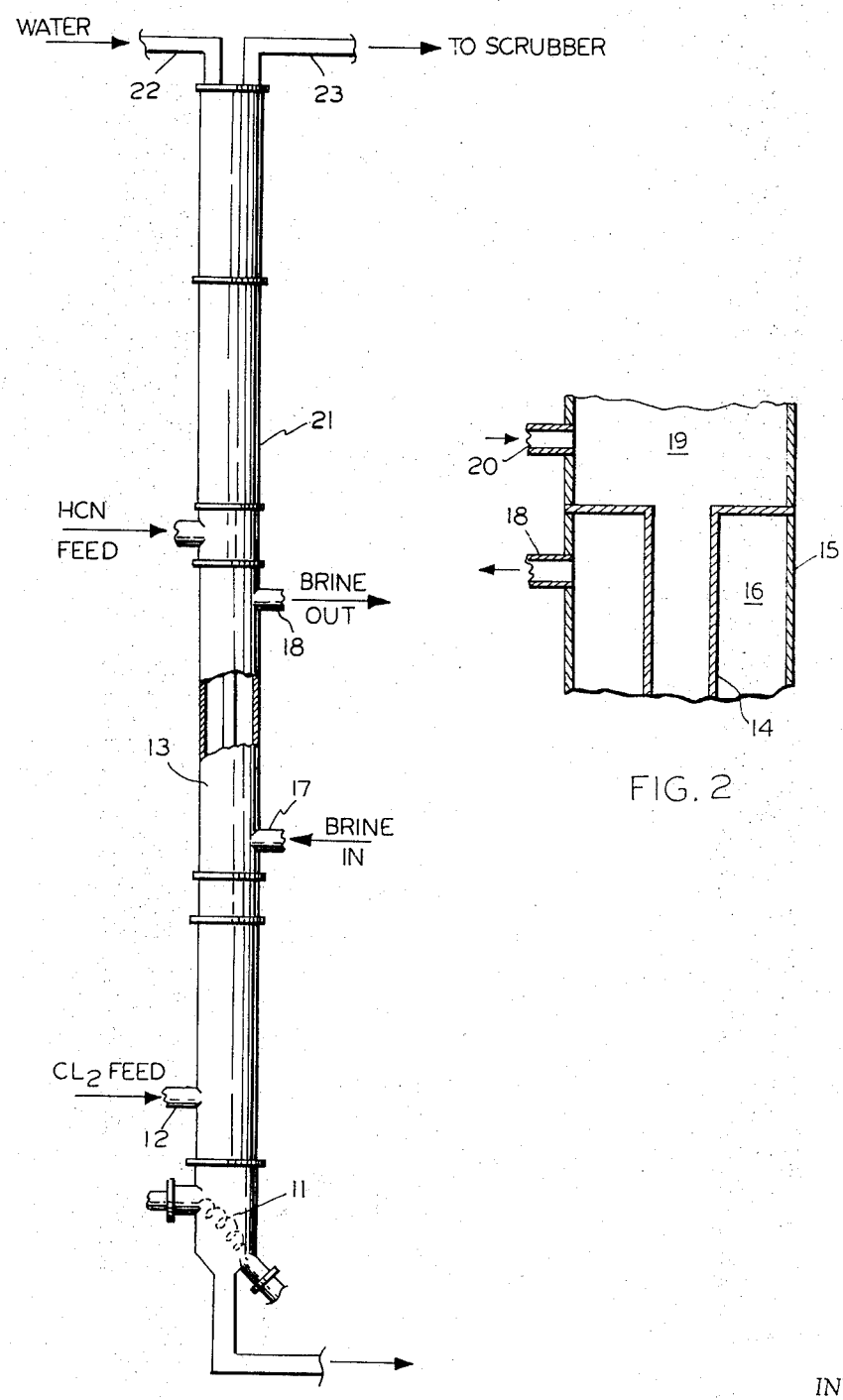

Table 1

| Run No. | Flow Rates (lb/hr) | | | Overhead Gas Composition | | | Bottoms Composition | | Conversion HCN-CNCl % | % Hydrolysis | Brine temp. | | Time Hr. |
|---|---|---|---|---|---|---|---|---|---|---|---|---|---|
| | HCN | $Cl_2$ | $H_2O$ | % CNCl | % $Cl_2$ | % HCN | % HCl | ppm HCN | | | In | Out | |
| 1 | 3.8 (Top) | 10.4 | 24 | 75.7-91.8 | 8.2-15.0 | Tr*-8.0 | 18.2-20.7 | Tr-10 | 93.5 | 1.1 - 4.1 | 3°C | 7°C | 5 |
| 2 | 3.8 (Top) | 10.4 | 32 | 85.4-91.9 | 5.7-9.0 | 1.9-7.5 | 11.1-15.4 | Tr-10 | 95. | 0.49 - 1.0 | 4.5°C | 8.5°C | 6 |
| 3 | 4.0 (Top) | 12.5 | 49 | 94.1-95.7 | 3.7-5.9 | ND**-0.6 | 10.9-11.2 | Tr | 99.5 | 0.2 - 0.25 | 0°C | 4°C | 2 |

\* Trace
\*\* Not detectable

E. BRUCE TRICKEY
INVENTOR

BY Wenderth, Lind & Ponack
ATTORNEYS

United States Patent Office 3,535,091
Patented Oct. 20, 1970

3,535,091
METHOD AND APPARATUS FOR PRODUCING CYANOGEN CHLORIDE USING A FALLING FILM REACTION COLUMN
Elwood Bruce Trickey, Mobile, Ala., assignor to Geigy Chemical Corporation, Ardsley, N.Y.
Filed Feb. 17, 1967, Ser. No. 616,873
Int. Cl. C01b 7/08; B01j 7/02; C01c 3/00
U.S. Cl. 23—359                                5 Claims

ABSTRACT OF THE DISCLOSURE

A falling film type reaction column is placed between a packed lower column and a packed upper column and a steam reboiler is provided in the bottom of the lower packed column. Chlorine is fed into the lower part of the lower column, hydrogen cyanide is fed into the top of the falling film reactor, and water is fed into the top of the packed upper column. The heat of reaction is removed from the falling film reactor by passing a cooling fluid around the outside of the falling film containing tube in the falling film reactor. Cyanogen chloride is taken off the top of the column as a gas. The byproduct aqueous hydrochloric acid is removed from the bottom of the column at concentrations up to about 21%.

BACKGROUND OF THE INVENTION

Field of the invention

This invention relates to a method and apparatus for the production of cyanogen chloride, and more particularly it relates to the production of cyanogen chloride in a falling film type of reactor column at higher acid conditions than heretofore thought possible.

Cyanogen chloride is a valuable intermediate for the production of cyanuric chloride, which in turn is useful as an intermediate for the manufacture of many products, such as chemotherapeutic agents, herbicides, dyes, brightening agents, synthetic resins, plastics, rubber, explosives and other materials.

DESCRIPTION OF THE PRIOR ART

A presently used commercial process of preparing cyanogen chloride for conversion into cyanuric chloride is described in U.S. Pat. 3,197,273 in the name of Elwood Bruce Trickey. In this process, chlorine and hydrogen cyanide are charged into the reaction section of a packed column having a purification, washing or scrubbing section, a reaction section, and a stripping section. Water is fed in at the top of the scrubbing section and steam is introduced at the base of the column at the bottom of the stripping section. By maintaining the proper rates of feed of the various materials, the temperature and conditions in the column can be maintained such that a high yield of cyanogen chloride is obtained as a gas at the top of the reactor.

The process of this patent, while it is quite satisfactory with respect to the quality and amount of the product which it is desired to produce, also produces at the bottom of the reactor column a byproduct of dilute, i.e. 2–3% aqueous hydrochloric acid. This byproduct is relatively easily disposed of when the quantity thereof is small, but in actual practice the amounts produced are so great that they cannot be disposed of simply by discharging into a stream or river without exceeding the amount which can be so discharged as established by pollution control standards. The alternative of concentrating the dilute hydrochloric acid and using it in other processes or selling it is not economically feasible, since the costs of concentrating the dilute acid are greater than purchasing concentrated acid from commercial sources.

Production of the cyanogen chloride under conditions which would produce the byproduct aqueous hydrochloric acid at higher concentrations have heretofore appeared to be an unlikely solution to the problems of byproduct disposal or byproduct recovery, because of the twin problems of intolerable, from the commercial standpoint, losses of the product cyanogen chloride by hydrolysis and directly from the bottom of the reaction column along with the byproduct hydrochloric acid. The necessity to keep hydrolysis losses low and substantially eliminate loss of cyanogen chloride are essential to the successful commercial production of cyanogen chloride. A third essential condition is the prevention of the formation of $NCl_3$, which is extremely explosive and therefore an undesired reaction product not only from the standpoint of loss of the primary product but also from the standpoint of safety.

SUMMARY OF THE INVENTION

The present invention relates to a method and apparatus for overcoming the problems described above and carrying out the reaction of chlorine and hydrogen cyanide to produce cyanogen chloride by feeding the two raw materials into a so-called falling film reaction column and extracting heat from the reaction zone by flowing a cooling fluid around the tube or tubes of the reactor which constitutes the main reaction zone. By carefully controlling the conditions in the reaction column, a very high rate of conversion to cyanogen chloride can be achieved at low hydrolysis losses for the cyanogen chloride and production of aqueous hydrochloric acid in concentrations up to about 23%.

BRIEF DESCRIPTION OF THE DRAWINGS

The invention will be described in connection with the accompanying drawings, in which:

FIG. 1 is a schematic view of a falling film type reaction column arranged to carrying out the method of the present invention;

FIG. 2 is an enlarged cross-sectional view of the top part of the falling film part of the column; and FIG. 3 is a table of the conditions and results obtained in carrying out the method of the invention.

DESCRIPTION OF THE PREFERRED EMBODIMENT

The falling film type column of the present invention comprises a lower stripping section 10 packed with conventional shapes, such as rings, saddles or the like, and it has a steam reboiler 11 in the bottom thereof and a chlorine inlet 12 in the lower part thereof. Next above the lower stripping section 10 is the falling film reactor 13, which comprises an inner or falling film tube 14 and an outer concentric tube 15 defining between it and said inner tube 14 an annular cooling fluid circulating chamber 16 having a cooling fluid inlet 17 at one end and a cooling fluid outlet 18 at the other end. In the upper end of the falling film reactor 13 shown is a feed chamber which has a feed inlet 20 for feeding HCN into the feed chamber.

Next above the falling film reactor 13 is an upper scrubbing section 21 which is also packed with conventional shapes, such as rings, saddles or the like. At the top of the scrubbing section is a water inlet 22 and a gas outlet 23 which takes off the gas produced within the column. The gas outlet 23 can, if desired, be connected to a further gas scrubber, not shown.

In operating the column to carry out the method, gaseous chlorine is fed into the lower stripping section through the chlorine inlet 12 and gaseous hydrogen cyanide is fed into the falling film reactor 13 through the chlorine inlet 20 at the top of the reactor 13. The amount of chlorine is in excess of that which is theoretically necessary to convert all of the HCN into CNCl. Water is fed into the top of the column through the water inlet 22 and removes HCN from the CNCl rising through the scrubbing section 21. A cooling fluid, for example brine, is circulated through the annular cooling fluid circulating chamber 16, being fed into the chamber through the inlet 17 and flowing out through the outlet 18. This cooling fluid removes the heat of reaction from the falling film reactor in which the main part of the reaction takes place. Steam is circulated through the steam coil of the steam reboiler 11 to heat the liquid in the stripping section 10 of the column to a temperature of about 102–110° C. to remove as much of the dissolved gaseous chlorine, HCN and CNCl as possible before the liquid is removed from the bottom of the column.

By introducing the HCN into the inlet at the top of the falling film reactor 13, there will be some HCN dissolved in the water falling through the scrubbing section 21 of the column and this will promote the reaction taking place along the film of liquid falling along the inside of the inner tube 14.

The temperature conditions in the column are quite different from those in the process described in the above mentioned patent. Sufficient cooling liquid is passed through the cooling fluid chamber 16 to keep the temperatures at the bottom and middle of the reaction section 13 between about 25 and 40° C., and the temperature at the top of the reaction section 13 between about 45 and 60° C. Immediately above the top of the reaction section 13 in the lower end of the scrubbing section 21 the temperature will rise due to the fact that a small part of the reaction will be taking place here, but it is preferred to control the conditions so that the temperature in the lower part of the scrubbing section does not rise much above about 65 to 70° C. The amount of heat in reaction extracted in the reaction section 13 is sufficient so that with the heat exchange in the scrubbing section 21 of the column and the cooling effect of the water fed into the top of the column, the temperatures within the scrubbing section 21 until at the top of the coulmn the temperature has fallen to near 25° C. It is preferred to reach this temperature at the top of the column, since at temperatures above this not all of the HCN may be stripped out of the cyanogen chloride. To aid in reaching these conditions, the temperature of the water fed into the top of the column should be between 13–25° C., and preferably 15–20° C. Lower temperatures may cause liquification of the cyanogen chloride.

The amount of the reaction products HCN and chlorine fed to the falling film reactor 13 and the amount of the water fed to the top of the column are controlled to cause the reaction to be carried out so that the concentration of aqueous hydrochloric acid at the bottom of the column is between about 10 and 23%. The actual amounts used will depend mainly on the size of the column, and only small variations should be necessary to take into account the temperature of the water being fed to the top of the column. Temperature control of the reaction will be mostly by means of the cooling fluid being passed through chamber 16 and the temperature and amount of such cooling fluid.

In order to illustrate the invention more fully, a series of examples will be given for falling film columns of a specific size and configuration.

EXAMPLES 1–3

The stripping section 10 was a packed column 4 in. in diameter and 4 ft. long, and the falling film reactor 13 was 9 ft. long and had a single ⅞ in. diameter inner tube. The scrubbing section 21 was made up of two 10 ft. long, 3 in. diameter packed columns.

The column was operated continuously over a period of from 2–6 hours by metering chlorine, HCN and water into the column at the rates set forth in Table I for runs 1–3. Steam was maintained in the reboiler coils at 35 lbs./sq. in. The HCN was fed into the falling film reactor 13 through the upper feed inlet 20.

As can be seen, the composition of the gas taken out of the top of the column was high in CNCl, and had the desired amounts of chlorine therein. It should be pointed out here, as mentioned in the said U.S. Pat. 3,197,273, that chlorine up to 15% should be contained in the cyanogen chloride in order to prevent the catalyst used in the subsequent preparation of cyanuric chloride from the cyanogen chloride from being poisoned. The presence of any excess of chlorine also has, of course, the advantage of assuring the completion of the desired reaction and reducing the amount of unreacted HCN in the final product.

On the other hand, the concentrations of hydrochloric acid in the byproduct were from 10.9 to 20.7%. The hydrolysis losses were extremely low, particularly in run 3. It can also be observed that as the concentration of the hydrochloric acid increases, the hydrolysis losses also increase.

While the apparatus described above and used in each of the examples had but a single tube in the falling film reactor 13, the invention is not limited to such a single tube reactor but includes such a reactor having a plurality of such tubes, each of which produces a falling film.

There has thus been provided a falling film reaction column having a cooled falling film reactor in the middle portion thereof, and a method of operation of the column to produce cyanogen chloride by reacting HCN and chlorine in the presence of a falling film of water while extracting a large part of the heat of reaction from the reaction zone of the column and thereby enabling the byproduct aqueous hydrochloric acid to be produced at a much higher concentration than heretofore. The more highly acid conditions under which the cyanogen chloride is produced do not, by operating the apparatus under the conditions of the method, cause any great drop in the efficiency of the process nor do they give undesirable characteristics to the resulting primary product. The more highly concentrated hydrochloric acid can be more easily converted into hydrochloric acid of a concentration in which it is directly usable or it can be used under some circumstances in the concentrations in which it comes from the bottom of the reaction column.

It is thought that the invention and its advantages will be understood from the foregoing description and it is apparent that various changes may be made in the form, construction and arrangements of the parts without departing from the spirit and scope of the invention or sacrificing its material advantages, the form hereinbefore described and illustrated in the drawings being merely a preferred embodiment thereof.

What is claimed is:

1. A method of making cyanogen chloride, comprising the steps of flowing water downwardly through a packed scrubbing column and then downwardly in a falling film along a heat exchange surface, while simultaneously flowing gaseous chlorine upwardly along the falling film and through the packed scrubbing column and flowing gaseous hydrogen cyanide into the downwardly flowing water at the upper end of the falling film, the chlorine and hydrogen cyanide being fed in at least stoichiometric proportions, removing cyanogen chloride from the top of the column, and controlling the temperature in the falling film by passing a heat exchange medium along the opposite side of the heat exchange surface for extracting at least a large part of the heat of reaction directly from said falling film, the amount of water being sufficient for maintaining the hydrochloric acid produced at the bottom of the falling film at a concentration of from about 10 to about 23%.

2. A method as claimed in claim 1 in which the temperature of the water introduced into the top of the column is from 13 to 25° C., and heat is added to the bottom of the stripping section of the column below the point of chlorine feed to keep the temperature at about 102–110° C., and the amount of heat extracted is sufficient to keep the temperatures at the bottom of the column between about 25 and 40° C. and the temperature at the top of the column between about 45° C. and 60° C.

3. A method as claimed in claim 1, in which the chlorine is fed in an amount which is in excess of that theoretically necessary to convert all of the hydrogen cyanide to cyanogen chloride.

4. A method of operating a falling film reactor column for producing cyanogen chloride, said column having a lower packed stripping section having a chlorine inlet therein, a falling film reactor next above said lower packed stripping section and having at least one inner tube and an outer tube therearound defining a cooling fluid circulating chamber between said inner and outer tubes, said outer tube having a fluid inlet and a fluid outlet therein, and said falling film reactor having a feed inlet for hydrogen cyanide at the upper end thereof, and an upper packed scrubbing section next above the falling film reactor and having a water inlet means at the top thereof, said method comprising the steps of feeding water into the top of the column through the water inlet means while feeding gaseous chlorine into the lower packed stripping section through the chlorine inlet means and feeding hydrogen cyanide into the upper end of the falling film reactor, the chlorine and hydrogen cyanide being fed in at least stoichiometric proportions, feeding the water with hydrogen cyanide dissolved therein in a falling film downwardly along the inside surface of said at least one inner tube, removing cyanogen chloride from the top of the column, and controlling the temperature in the falling film by passing a cooling fluid through said cooling fluid circulating chamber to extract at least a large part of the heat of reaction from said falling film, the amount of water being sufficient for maintaining the hydrochloric acid produced at the bottom of the column at a concentration of from about 10 to about 23%.

5. A method as claimed in claim 4 in which the temperature of the water introduced into the top of the column is from 13 to 25° C., and a reboiler unit is provided in the bottom of the column and steam is circulated through the reboiler unit to keep the temperature in the bottom of the column at about 102–110° C., and the cooling fluid is circulated through the cooling fluid chamber in an amount and at a rate to remove sufficient heat to make the temperature at the bottom of the column between about 25° C. and 40° C. and the temperature at the top of the column between about 45° C. and about 60° C.

References Cited

UNITED STATES PATENTS

| 2,672,398 | 3/1954 | Huemer et al. | 23—359 |
|---|---|---|---|
| 3,197,273 | 7/1965 | Trickey | 23—359 |
| 2,753,346 | 7/1956 | Huemer | 23—359 |

OSCAR R. VERTIZ, Primary Examiner

H. S. MILLER, Assistant Examiner

U.S. Cl. X.R.

23—154, 283